United States Patent Office 2,714,394
Patented Aug. 2, 1955

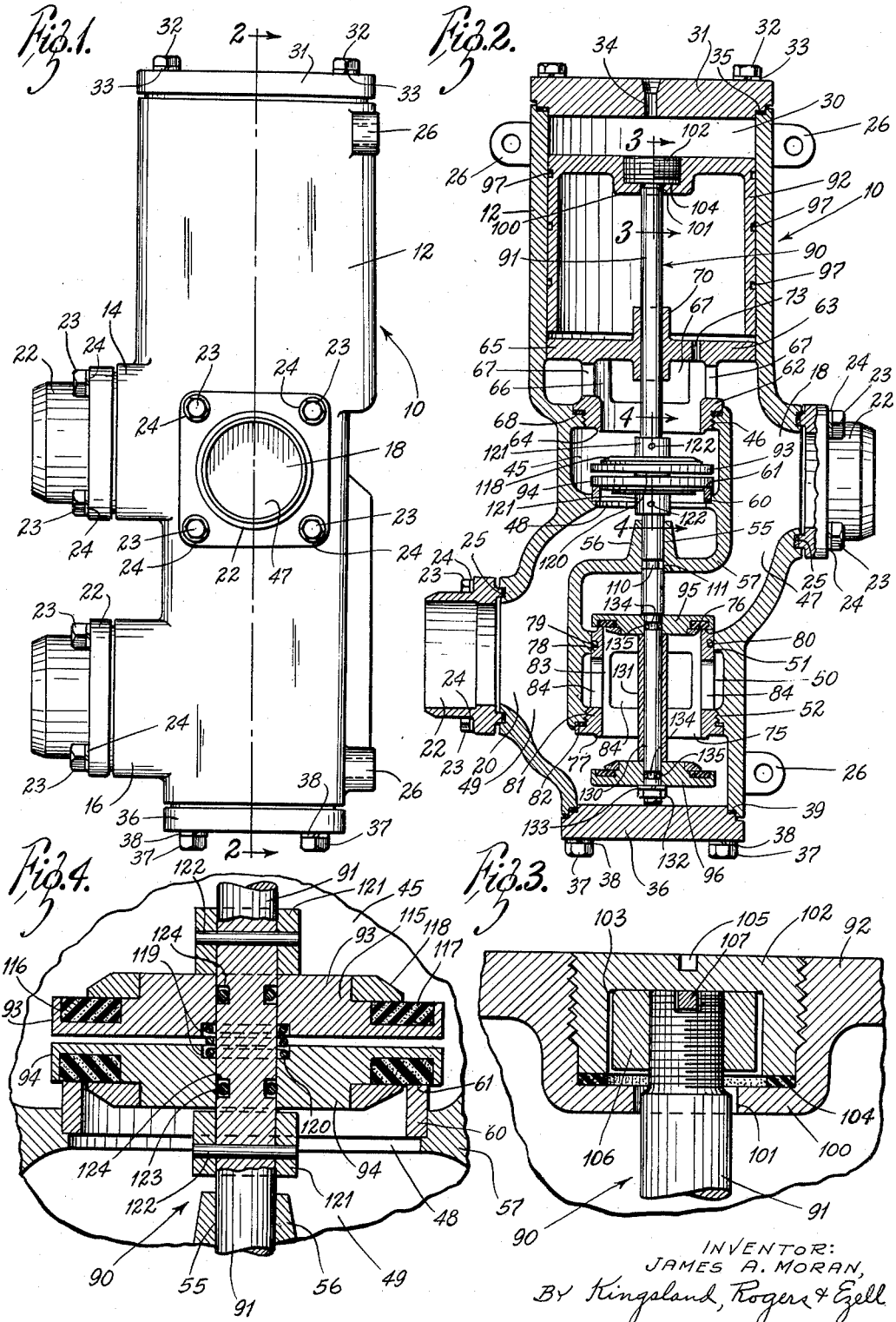

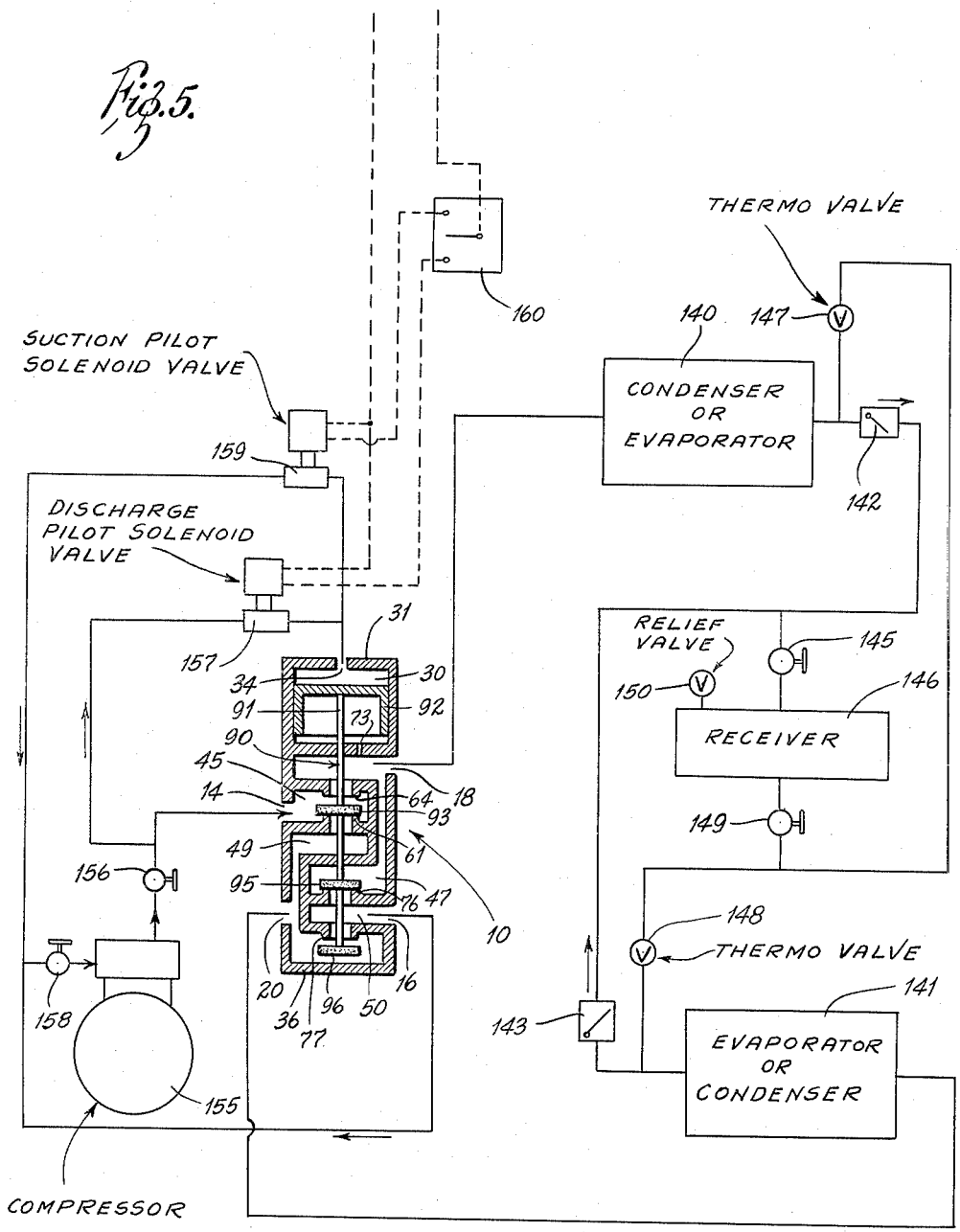

2,714,394

FOUR-WAY CHANGE-OVER VALVE

James A. Moran, St. Louis, Mo., assignor to Alco Valve Company, University City, Mo., a corporation of Missouri Application March 5, 1951, Serial No. 213,864

10 Claims. (Cl. 137—625.29)

The present invention relates to valves, and more particularly to a power operated, four-way, change-over type of valve which is selectively operable to connect a main inlet port with one working port and, at the same time, to connect a main outlet port with another working port, and which is further operable simultaneously to reverse the connections so as to connect the main inlet port with the other working port and to connect the main outlet port with the first mentioned working port, there being interflow between the main inlet and the main outlet only during the moment of change-over.

A valve of the type described finds particularly useful application in the air conditioning field, especially where the air conditioning problem may require alternate cooling and heating. An apt illustration of such a problem lies in the temperature conditioning requirements of transport trucks used for transporting perishable food products. The temperature conditioning equipment for such a conveyance may well include a combination refrigerating and heating system having two separate heat exchange units, each of which is adapted to function either as an evaporator or as a condenser in a refrigerating system. It is obvious that if one such heat exchange unit is disposed interiorly of the truck cargo space and the other is disposed exteriorly thereof, the two units may be so arranged in the directional flow pattern of the refrigerating cycle as to permit the interiorly disposed unit to function either as a condenser giving off heat or as an evaporator absorbing heat. Further, it is apparent that if the flow of refrigerant can be reversed, then the interiorly disposed heat exchange unit is adapted to function alternately either to heat or to cool the interior of the cargo space. Inasmuch as temperature conditioning requirements, such as the need for cooling at one time and for heating at another, vary not only from one section of the country to another, but may also vary from one hour to the next in the same locality, it is obviously advantageous to provide equipment as above described which is adapted for both heating and cooling, and it is further obvious that a valve which is adapted to reverse the flow in the refrigerating cycle and which can be power operated in accordance with the current demand for heat or refrigeration as the case may be, will be indispensible to efficient automatic control of the equipment.

It is an object of the present invention, therefore, to provide an arrangement in which a valve of the type described may be caused to respond to variable demands for a change in a mode of heat transfer.

It is another object of the invention to provide a valve of the type described which is adapted to conduct fluid along separate paths therethrough without interflow therebetween and which is operable to change the flow pattern therewithin to produce a desired change in the direction of flow of the fluid through external elements connected therewith.

It is another object of the invention to provide a valve of the type described in which separate paths of flow therethrough are adapted to accommodate fluid at different pressures, and in which the pressure differential existing therein acts to maintain a desired flow pattern within the valve.

It is another object of the invention to provide a valve of the type described in which a power receiving element is adapted to effect a desired change in flow pattern through the valve and, thereafter, to be compensated in a manner to relieve its influence upon the flow control mechanism of the valve.

It is another object of the invention to provide a valve construction of the type described in which a plurality of separate valve elements connected to a single actuator are respectively adapted simultaneously to occupy separate valve seats disposed in approximate predetermined spaced relation one to another.

Additional objects of the invention include the provision of a valve of the type described which is compact, which is readily assembled and disassembled, which is relatively non-critical in regard to manufacturing tolerances in respect to the valve mechanism, and which can be expected to render long, dependable, and efficient service of the type intended.

Still other objects and advantages will appear from the following description taken in conjunction with the accompanying drawings, in which:

Fig. 1 is a vertical elevation of a four-way change-over valve construction in accordance with the teachings of the present invention;

Fig. 2 is a sectional elevation thereof taken generally along the line 2—2 of Fig. 1;

Fig. 3 is an enlarged fragmentary sectional elevation thereof taken generally along the line 3—3 of Fig. 2;

Fig. 4 is an enlarged fragmentary sectional elevation thereof taken along the line 4—4 of Fig. 2; and Fig. 5 is a schematic diagram showing a typical application of the valve of the present invention.

Referring to the drawings more particularly by reference numerals, 10 indicates generally a four-way change-over valve constructed in accordance with the teachings of the present invention. The valve 10 comprises a body 12 having a main inlet port 14, a main outlet port 16, an upper working port 18, and a lower working port 20. Although the depicted embodiment of the invention indicates these several ports as being of equal size, this is not a required condition. As is clear from Figs. 1 and 2, each of the enumerated ports terminates at an externally grooved face adapted to receive a removable annular tongued pipe fitting 22 secured to the body 12 by means of cap screws 23 and lock washers 24. The pipe fittings 22 are, in turn, adapted to receive appropriate conduits (not shown), and gaskets 25 are provided to seal the tongue and groove joints between the respective pipe fittings 22 and the body 12. The valve 10 is preferably installed for operation in the vertical position depicted in the several views of the drawing, mounting lugs 26, integral with the body 12, being provided for this purpose.

The internal construction of the body 12 is clearly apparent from Fig. 2 and is seen to include a piston chamber 30 closed by a removable cover plate 31 secured by cap screws 32 and lock washers 33. Centrally of the cover plate 31, a port 34 is provided for a purpose to appear. A gasket 35 provides an appropriate seal between the body 12 and the cover plate 31. The lower end of the body 12 is closed by a removable cover plate 36 secured by means of cap screws 37 and lock washers 38, this joint being sealed by means of a gasket 39.

Intermediate the piston chamber 30 and the lower end of the body 12, there are various interconnected passageways and chambers, as will appear. Thus, a main inlet chamber 45, which is in direct communication with the main inlet port 14, has a threaded aperture 46 communicating with a working chamber 47 in which is formed the upper working port 18. An aperture 48, coaxial with the threaded aperture 46, communicates the main inlet chamber 45 with a working chamber 49 in which is formed the lower working port 20. A main outlet chamber 50, in direct communication with the main outlet port 16, also has coaxial apertures including a straight bored aperture 51 communicating with the working chamber 47, and a threaded aperture 52 communicating with the working chamber 49. It will be noted that there is no direct communication between the main inlet chamber 45 and the main outlet chamber 50, nor is there direct communication between the working chambers 47 and 49 except through a cylindrical bore 55 in a boss 56 formed integral with a web 57 which separates the working chambers 47 and 49.

The aperture 48 is counterbored to receive an insert 60 having a seat portion 61, as best shown in Fig. 4. As best shown in Fig. 2, the threaded aperture 46 receives an insert portion 62 of an adaptor 63 so as to dispose a seat portion 64 in the chamber 45. The adaptor 63 includes also a disc portion 65 which defines the lower end of the piston chamber 30, and a cage portion 66 having a plurality of ports 67 serving to communicate the interior of the insert portion 62 with the working chamber 47. The threaded joint between the insert portion 62 and the aperture 46 is appropriately sealed by means of a gasket 68. Centrally of the disc portion 65, a cylindrically bored guide boss 70 is provided for a purpose to appear. A bleed port 73 is provided to communicate the upper and lower sides of the disc portion 65.

It will be noted that both the seat portions 61 and 64 are disposed within the main inlet chamber 45 so as to face each other. Contrary to this condition as clearly shown in Fig. 2, an insert cage 75 having seat portions 76 and 77 is mounted in the threaded aperture 52 of the main outlet chamber 50 so as to dispose the seat portion 76 adjacent the aperture 51 but externally of the main outlet chamber 50 and the seat portion 77 adjacent the threaded aperture 52 but also externally of the main outlet chamber 50. Thus disposed, it is apparent that the respective seat portions 76 and 77 face away from each other. It may be mentioned that, although the several seat portions above enumerated may be of different diameters, it will generally be found preferable to employ equal diameters at least for each of the pairs associated respectively with the chambers 45 and 50.

The insert cage 75 includes an upper ring portion 78 on which the seat portion 76 is formed and which rotatably engages the cylindrically bored aperture 51, the joint therebetween being sealed by an O-ring 79 disposed in a groove 80. A lower ring portion 81, on which is formed the seat portion 77, threadedly engages the aperture 52, the joint therebetween being sealed by an appropriate gasket 82. Intermediate the upper and lower ring portions 78 and 81, a cage portion 83 contains a plurality of ports 84 communicating the interior of the insert cage 75 with the main outlet chamber 50.

It will be noted that the seat portions 61, 64, 76 and 77, as well as the cylindrical bored bosses 56 and 70, are all disposed so as to be coaxial with the main vertical axis of the body 12, including the piston chamber 30. Thus disposed, the several elements enumerated are adapted to cooperate with a valve assembly 90, as will appear.

The assembly 90 includes a valve rod 91, on which is mounted a piston 92, two main inlet valves 93 and 94 and two main outlet valves 95 and 96, all as clearly shown in Fig. 2. The piston 92 is shaped like an inverted cup and is slidably received in the piston chamber 30, there being a plurality of external grooves 97 which, in conjunction with a predetermined closeness of fit between the piston 92 and the wall of the piston chamber 30, are adapted to provide appropriate freedom of movement of the piston 92 with minimum fluid leakage therepast.

The piston 92 is connected to the valve rod 91 so as to provide a floating engagement therebetween, as best shown in Fig. 3. Thus, it is seen that a boss portion 100 of the piston 92 is bored, as at 101, loosely to receive the upper end of the valve rod 91, and counterbored and threaded to receive a plug 102 having an internal recess 103. A gasket 104 seals this threaded connection and a slot 105 is provided for tightening the plug 102. A nut 106 threadedly engages the upper end of the valve rod 91 and is appropriately pinned or keyed thereto as by a key 107.

The valve rod 91, disposed coaxially with the body 12, extends slidably through the cylindrically bored bosses 70 and 56 and is adapted for limited vertical movement therein. An annular groove 110 is provided at a point in the valve rod 91 which remains within the bore 55 during such vertical movement. An O-ring 111 is disposed in the groove 110 to effect a seal between the working chambers 47 and 49. It may be noted that the bore 55, the groove 110, and the O-ring 111 are so dimensioned as to provide a condition wherein the O-ring 111 abuts both the reduced cylindrical portion of the groove 110 and the bore 55 substantially without compression of the O-ring 111 itself. It has been found that an O-ring thus mounted provides an effective seal against fluid pressure differences of 250 pounds per square inch. Obviously, no special sealing means is required in the boss 70 inasmuch as the existence of the bleed port 73 indicates the desirability of pressure equalization across the disc portion 65 of the adaptor 63.

The valves 93, 94, 95 and 96 are of materials and construction appropriate to the conditions under which the valve 10 is to be operated; as shown in Figs. 2 and 4, each may comprise, for example, a valve disc 115 having an annular recess 116 receiving a resilient ring 117 secured by a press fitted retaining ring 118, it being obvious that the resilient rings 117 are adapted to cooperate respectively with the several seat portions disposed within the body 12. The valve discs 115 of the valves 93 and 94 differ from those of the valves 95 and 96 in that each of the former has a counterbored recess 119 adapted to receive one end of a compression spring 120 as clearly shown in Fig. 4. The valves 93 and 94, with the spring 120 interposed therebetween, are slidably mounted on the valve rod 91 so as to be disposed in the main inlet chamber 45. Thus mounted, it is obvious that the biasing action of the spring 120 is such as to tend to maintain axial separation of the valves 93 and 94, which separation, however, is limited by abutment of the valve discs 115 respectively with upper and lower collars 121 secured to the valve rod 91 by means of pins 122. The sliding fits between the valve rod 91 and the respective valves 93 and 94 are sealed by means of O-rings 123 disposed in annular grooves 124 in the valve rod 91.

A portion 130 of the valve rod 91 adjacent the lower end thereof is reduced in diameter to receive the valves 95 and 96 which are separated from each other by a sleeve 131, the three last mentioned elements being rigidly secured to the valve rod 91 by means of a nut 132 and a lock washer 133. Obviously, the valve discs 115 of the valves 95 and 96 must be slidable upon the portion 130, and the latter, therefore, has annular grooves 134 receiving O-rings 135 to prevent fluid leakage past these valves.

Certain elements of the valve assembly 90 cannot be mounted upon the valve rod 91 until the latter is properly positioned in the valve body 12. The sequence of assembly of the valve 10, therefore, comprises first pressing the insert 60 into its above-described position in the counterbored portion of the aperture 48 and then inserting the valve rod 91 with the valves 93 and 94, including the spring 120, mounted thereon and secured by the pinned collars 121, this insertion being made through the piston chamber 30 with the valves 93 and 94 passing through the threaded aperture 46. The gasket 68 and the adaptor 63 may then be also inserted through the piston chamber 30 and screwed into position. The valve 95 may then be inserted through the opening at the lower end of the body 12 and mounted in its proper position on the reduced portion 130 of the valve rod 91, it being noted that the internal diameters of the apertures 51 and 52 are so related to the maximum diameter of the valve discs 115 of the valve 95 as to permit passage of the latter through these apertures. The insert cage 75 with the gasket 82 mounted thereon may then be inserted through the lower opening of the body 12 and screwed into position. The sleeve 131 and the valve 96 may then be assembled onto the reduced portion 130 and secured as aforementioned by the nut 132 and the lock washer 133. The piston 92 may then be inserted in the piston chamber 30 so as to receive the upper threaded end of the valve rod 91, as previously mentioned. The nut 106 may then be screwed onto the upper end of the valve rod 91 and the key 107 inserted, after which the gasket 104 may be placed in position and the plug 102 screwed down. It is, of course, obvious that the several O-rings incorporated in the assembly of the valve 10 are inserted along with the grooved elements in which each is retained. The manner of closing the upper and lower ends of the body 12 to complete the assembly of the valve 10 is also obvious, as is the connection of the several pipe fittings 22 to the respective ports 14, 16, 18 and 20.

In its operation, the valve 10 is clearly adapted to connect the main inlet port 45 to either the working port 47 or the working port 49 and, at the same time, to connect the main outlet port 50 to the other of the working ports 47 and 49. The main inlet port 45 and the main outlet port 50 are, of course, never directly connected and it is only during the instant of change-over that they are simultaneously connected to the same working port. Thus, with the valve assembly 90 in the position shown in Figs. 2 and 4, the valve 94 occupies the seat portion 61 so as to close the aperture 48 and, in similar manner, the valve 95 occupies the seat portion 76 to close the aperture 51. The valves 93 and 96, however, being withdrawn from the seat portions 64 and 77 respectively, clearly provide for free communication between the main inlet chamber 45 and the working chamber 47 and between the main outlet chamber 50 and the working chamber 49, respectively.

If conditions are such, as will normally be the case where the valve 10 is used, that the pressure within the main inlet chamber 45 is greater than the pressure within the main outlet chamber 50, then the particular working chamber, be it 47 or 49, connected to the main inlet chamber 45, will have established therein a similar higher pressure than that which will exist in the one connected to the main outlet chamber 50, and it is clear, not only that the difference between these pressures will exist across the closed valves, such as 94 and 95 in the illustrated case, but also that the directional characteristics of this pressure difference will tend to maintain the valves in their closed position.

It is obvious from Fig. 2 that the static condition of the valve assembly 90 depicted therein is but one of two such conditions attainable in the valve 10, the other clearly comprising a situation wherein the valves 93 and 96 are seated and the valves 94 and 95 are unseated. The attainment of this alternate condition clearly effects connection of the main inlet chamber 45 with the working chamber 49 and connection of the main outlet chamber 50 with the working chamber 47, both the inlet chamber 45 and the outlet chamber 50 being now closed to the respective working chambers with which they were previously connected. Notwithstanding this changed position of the valve assembly 90, however, it will be noted that operating pressure differences which will exist across the now closed valves 93 and 96 are again such as to tend to maintain the alternate static condition now assumed to be effected. It is apparent, then, that when the valve assembly 90 is once shifted to either of its two static positions, the pressure conditions which normally exist within the valve 10 will tend, not only to maintain such static position, but will also be effective to insure tight closure of the particular valves meant to be closed. Maximum utilization of this advantageous pressure condition existing in the valve 10 is made possible by the aforementioned resilient mounting of the valves 93 and 94 to the valve rod 91. Either the valve 95 or the valve 96, both of which are rigidly mounted on the valve rod 91, will control the exact vertical position of the latter when in static condition, and it is evident that the resilient mounting of the valves 93 and 94 permits either to be biased to a firm seat regardless of normal variations in manufacturing tolerance or wear of parts.

Movement of the valve assembly 90 from one static position to the other may be effected by means of the piston 92 which is adapted to move in response to the same pressure difference that normally exists, as aforementioned, within the valve 10. Thus, if the threaded port 34 in the upper closing member 31 has a controlled connection both to the source of pressure normally maintained in the main inlet chamber 45 and to that normally maintained in the main outlet chamber 50, it is obvious that communication of the piston chamber 30 with the latter source will, with the valve shown in the position of Fig. 2, produce a relatively low pressure above the piston 92 as compared with the relatively high residual pressure existing therebelow by virtue of the bleed port 73 communicating the lower end of the piston chamber 30 to the relatively high pressure existing within the main inlet chamber 45. Under this pressure differenential, and with the cross-sectional area of the piston 92 being somewhat in excess of the combined effective cross-sectional areas of the valves 94 and 95, the piston 92 will move upwardly to effect the alternate static position of the valve assembly 90 and thus effect the previously described change in the pattern of flow through the valve 10. As aforementioned, however, the upper position of the valve assembly 90 effects the aforementioned low pressure in the working chamber 47, which pressure again by virtue of the communication provided by the bleed port 73 to the lower end of the piston chamber 30, is effective to balance the pressures above and below the piston 92 so that the latter attains a compensated or balanced static condition in which no force is transmitted to the valve rod 91.

With a relatively low pressure existing below the piston 92, the subsequent connection of the upper part of the piston chamber 30 to the source of pressure normally maintained in the main inlet chamber 45 produces a pressure difference across the piston 92 which is effective to return the valve assembly 90 to the position of Fig. 2. This reestablishes a high pressure condition in the working chamber 47, which condition is communicated to the interior of the piston 92, again by means of the bleed port 73, so that the piston 92 is once more brought to a balanced condition.

Fig. 5 shows a typical installation of the valve 10 in a temperature conditioning system which includes a heat exchange unit 140 directly connected to the working port 18 and a heat exchange unit 141 directly connected to the working port 20. Each of the heat exchange units 140 and 141 is adapted to function as either a condenser or an evaporator. The ends of the heat exchange units 140 and 141 opposite to those which are connected to the valve 10 are connected respectively to directional check valves 142 and 143, both of which are, in turn, connected to a receiver 146. These last connections may be made through a valve 145, if such is desired, for pump-down and servicing of the system. These same ends of the heat exchange units 140 and 141 are also connected respectively to thermovalves 147 and 148, both of which are, in turn, connected to the receiver 146. A valve 149, similar in purpose to the valve 145, may be incorporated in this last mentioned connection. A relief valve 150 may be connected into the receiver 146 to prevent the attainment of excessive pressure within the system.

A compressor 155 has its discharge outlet connected through a service valve 156 (optional) into the main inlet port 14 of the valve 10, and also through a normally closed solenoid control valve 157 into the port 34 at the upper end of the piston chamber 30. Similarly, the suction inlet of the compressor 155 is connected through a service valve 158 (optional) into the main outlet port 16 of the valve 10, and also through a normally closed solenoid control valve 159 into the port 34. Both the solenoid valves 157 and 159 are electrically connected to a single pole double throw switch 160, as clearly shown by broken lines in Fig. 5, from which it is obvious that only one of the valves 157 and 159 may be energized at any time. It is, of course, apparent that the two valves 157 and 159 could be replaced by a single three-way valve of appropriate design and mode of actuation.

The schematic diagram of Fig. 5 clearly shows that, under normal operating procedure, the main inlet chamber 45 of the valve 10 is continuously connected to the discharge side of the compressor 155, while the main outlet chamber 50 is continuously connected to the inlet side of the compressor 155, while the main outlet chamber 50 is continuously connected to the suction side of the compressor 155. It is further evident that either the discharge pressure or the suction pressure of the compressor 155 may be selectively communicated to the piston chamber 30 through the action of the solenoid valves 157 and 159, respectively. Thus, except for predetermined pressure drops existing in the respective connections of the compressor discharge and the compressor suction with the chambers 45 and 50, the pressures communicated to the piston chamber 30 above the piston 92 will equal that which normally exists in either the chamber 45 or the chamber 50.

The several elements of the temperature conditioning system which are connected between the working ports 18 and 20 are seen to be symmetrically arranged and it is readily apparent that the direction of refrigerant flow through the system may be either from the port 18 and back to the port 20 or vice versa. Thus, with the valve assembly 90 in the position shown in Fig. 5, the discharge from the compressor 155 is conducted through the main inlet port 14 directly to the working port 18, hence, to the heat exchange unit 140 which, under this condition, acts as a condenser. From the unit 140, the refrigerant flows through the check valve 142 and, upon being blocked by the check valve 143, enters the receiver 146. From the receiver 146, the flow continues through the thermo valve 148 and the heat exchange unit 141, which at this time acts as an evaporator, and hence back to the working port 20. The latter, being now directly connected to the main outlet port 16, thus provides for the return of the refrigerant to the suction side of the compressor 155.

If it is assumed, for example, that the heat exchange unit 140 is installed in a space in which the temperature is to be controlled within predetermined limits, and the heat exchange unit 141 is installed outside this space, it is apparent that the condition of the heat conditioning system as shown in Fig. 5 will result in the release of heat from the heat exchange unit 140 which acts as a condenser, and it is further evident that heat is taken into the system through the heat exchange unit 141 which acts as an evaporator. If, now, the switch 160 should be actuated either manually or by thermostatic control to deenergize the solenoid valve 157 and to energize the solenoid valve 159, the suction pressure of the compressor 155 will be communicated to the piston chamber 30, and the valve assembly 90 will be displaced upwardly as previously described. From the previous description of operation of the valve 10, it is apparent that this new condition will direct the flow of refrigerant from the main inlet chamber 45 to the working port 20, hence to the heat exchange unit 141, which now acts as a condenser. From the heat exchange unit 141, the refrigerant now flows through the check valve 143 and upon being blocked by the check valve 142 passes through the receiver 146 and the thermo valve 147 to the heat exchange unit 140 which now acts as an evaporator. From the heat exchange unit 140, the refrigerant again enters the valve 10 by way of the working port 18 which being now connected with the main outlet chamber 50 directs the refrigerant back to the suction side of the compressor 155. It is thus obvious that this reversal of flow through the elements connected between the working ports 18 and 20 effects changes in function of both the heat exchange units 140 and 141, whereby the former is now adapted to absorb heat while the heat exchange unit 141 dissipates the heat thus absorbed.

Clearly, there has been described a change-over valve and an application therefor which fulfills the objects and advantages above set forth, as well as others which are now apparent. It is to be understood that the foregoing description and the accompanying drawings have been given by way of illustration and example. It is further to be understood that changes in the form of the elements, rearrangement of parts, and substitution of equivalent elements, which will be obvious to those skilled in the art, are contemplated as within the scope of the present invention, which is limited only by the claims which follow.

What is claimed is:

1. In a valve construction, a housing having a main high pressure inlet, a return low pressure outlet, a first working outlet for the passage of fluid through the housing, and a second working outlet for the passage of fluid through the housing, and both of said first and second outlets being separated from one another and including openings in the housing for passage of fluid into and out of the housing, an inlet valve chamber and an outlet valve chamber in said housing, each chamber having a first and a second valve seat, said several valve seats being in coaxial relation with one another, said first working outlet communicating with the first valve seat of the inlet chamber and with the second valve seat of the outlet chamber, said second working outlet communicating with the second valve seat of the inlet chamber and with the first valve seat of the outlet chamber, valve means comprising first and second inlet valve members for the inlet chamber and first and second outlet valve members for the outlet chamber, said valve members for the inlet chamber being disposed interiorly thereof, said valve members for the outlet chamber being disposed exteriorly thereof, said valve means being movable from a first position engaging said first valve members and said first valve seats respectively to a second position engaging said second valve members and said second valve seats respectively, and means for moving said valve means from either position to the other, said moving means comprising a pressure-responsive mechanism separated from said inlet and outlets.

2. In a valve construction, a housing having a main high pressure inlet, a return low pressure outlet, a first working outlet for the passage of fluid through the housing, and a second working outlet for the passage of fluid through the housing, and both of said first and second outlets being separated from one another and including openings in the housing for passage of fluid into and out of the housing, an inlet valve chamber and an outlet valve chamber in said housing, each chamber having a first and a second valve seat, said several valve seats being in coaxial relation with one another, said first working outlet communicating with the first valve seat of the inlet chamber and with the second valve seat of the outlet chamber, said second working outlet communicating with the second valve seat of the inlet chamber and with the first valve seat of the outlet chamber, valve members comprising first and second inlet valve members for the inlet chamber and first and second outlet valve members for the outlet chamber, said valve members for the inlet chamber being disposed interiorly thereof, said valve members for the outlet chamber being disposed exteriorly thereof, said valve means being movable from a first position engaging said first valve members and said first valve seats respectively to a second position engaging said second valve members and said second valve seats respectively, and means for moving said valve means from either position to the other, said moving means comprising a pressure-responsive mechanism including a pressure-movable member disposed in a chamber separated from said inlet and outlets, there being passage means continuously communicating said chamber and said first working outlet.

3. In a valve construction, a housing including an inlet port, an outlet port, first and second working ports, all of said ports being for the passage of fluid into and out of the housing and passages interconnecting said several ports, said passages including a first aperture between said inlet port and said first working port, a second aperture between said inlet port and said second working port, a third aperture between said outlet port and said first inlet port, and a fourth aperture between said outlet port and said second working port, said several apertures being in coaxial relation, valve means including a plurality of coaxial valve elements two of which are slidable on a valve rod connecting all said valve elements for cooperation with said several apertures, said slidable valve elements being movable relative to the others, means biasing said movable valve elements toward at least one of said apertures, said valve means being movable from a first position to close said first and fourth apertures and from a second position to close said second and third apertures, and means for displacing said valve means from one of said positions toward the other of said positions.

4. In a valve construction, a housing having an inlet, an outlet, and two working ports, all of said ports being for the passage of fluid into and out of the housing, an inlet chamber having coaxial oppositely spaced apertures, the inlet being connected to the chamber between the apertures, one aperture leading to each working port, an outlet chamber having coaxial oppositely spaced apertures, the outlet being connected to the outlet chamber between the apertures therein, one outlet aperture leading to each working port, a valve seat for each aperture, a valve assembly comprising a valve element for respective cooperation with each valve seat, a single member mounting said valve elements for movement therewith, two of said valve elements being movable and two being non-movable with respect to said single member, said two movable valve elements having biasing means opposing movement of said valve elements toward one another, and means for moving said single member from a first position to a second position or vice versa.

5. In a valve construction, a housing having an inlet, an outlet, and two working ports, all of said ports being for the passage of fluid into and out of the housing an inlet chamber having coaxial oppositely spaced apertures, the inlet being connected to the chamber between the apertures, one aperture leading to each working port, an outlet chamber having coaxial oppositely spaced apertures, the outlet being connected to the outlet chamber between the apertures therein, one outlet aperture leading to each working port, a valve seat for each aperture, a valve assembly comprising a valve element for respective cooperation with each valve seat, a single member mounting said valve elements for movement therewith, two of said valve elements being movable and two being non-movable with respect to said single member, means biasing said movable valve elements toward their respective seats and away from one another, said two movable valve elements further being wholly confined within one of said inlet and outlet chambers, and means for moving said single member from a first position to a second position or vice versa.

6. In a valve construction, a housing having an inlet chamber and an outlet chamber, apertures in each of said chambers, a cylindrical section coaxial with said apertures, a pressure responsive member movable in said cylindrical section, a first valve disposed on the inner side of the apertures in said inlet chamber, second and third valves disposed on the outer sides of the apertures in the outlet chamber, a valve rod connecting said valves and the pressure responsive member in coaxial relation, one of the apertures in the inlet chamber being between the first valve and the pressure responsive member and having a ring portion received therein, said ring portion being part of a cage and having a valve seat for the first valve and an upper disc portion received in said cylindrical section, guide means in said disc portion for said valve rod, and a cage received in the outlet chamber and having opposed ring portions received within the apertures in the outlet chamber, said last named ring portions having valve seats therein engageable with the second and third valves.

7. In a valve construction, a housing having an inlet chamber and an outlet chamber, apertures in each of said chambers, a cylindrical section coaxial with said apertures, a pressure responsive member movable in said cylindrical section, a first valve disposed on the inner side of the apertures in said inlet chamber, second and third valves disposed on the outer sides of the apertures in the outlet chamber, a valve rod connecting said valves and the pressure responsive member in coaxial relation, one of the apertures in the inlet chamber being between the first valve and the pressure responsive member and having a ring portion received therein, said ring portion being part of a cage and having a valve seat for the first valve and an upper disc portion received in said cylindrical section, guide means in said disc portion for said valve rod, a cage received in the outlet chamber and having opposed ring portions received within the apertures in the outlet chamber, said last named ring portions having valve seats therein engageable with the second and third valves, a first working port communicating one side of said first valve with the second valve, and a second working port separated by partition means from the first port and communicating the second side of the first valve with the third valve.

8. In a valve construction, a housing having an inlet, an outlet, and two working ports, all of said ports being for the passage of fluid into and out of the housing, an inlet chamber having coaxial oppositely spaced apertures, the inlet being connected to the chamber between the apertures, one aperture leading to each working port, an outlet chamber having coaxial oppositely spaced apertures, the outlet being connected to the outlet chamber between the apertures therein, one outlet aperture leading to each working port, a valve seat for each aperture, a valve assembly comprising four valve elements guidable by valve rod means for cooperation with said apertures, a first and second of said valve elements being wholly confined within said inlet chamber and having biasing means urging said valve elements away from one another, stop means on the valve rod means urging the first of said movable valve elements toward the second valve element by the action of said biasing means to close the second valve element against one of the apertures in the inlet chamber, said stop means further including means for urging the second of said movable valve elements toward the first valve element by the action of said biasing means to close the first valve element against a second one of the apertures in the inlet chamber when the movement of the valve rod means is reversed.

9. In a valve construction, a housing having an inlet, an outlet, and two working ports, all of said ports being for the passage of fluid into and out of the housing, an inlet chamber having coaxial oppositely spaced apertures, the inlet being connected to the chamber between the apertures, one aperture leading to each working port, an outlet chamber having coaxial oppositely spaced apertures, the outlet being connected to the outlet chamber between the apertures therein, one outlet aperture leading to each working port, a valve seat for each aperture, a valve assembly comprising four valve elements guidable by valve rod means for cooperation with said apertures, a first and second of said valve elements being wholly confined within said inlet chamber and having biasing means urging said valve elements away from one another, the third and fourth of said valve elements being adapted to be attached to said valve rod means exteriorly of said outlet valve chamber, limit means on said valve rod means for limiting movement of the third valve element in one direction, and spacing means cooperating with said valve rod means for holding said third valve element against the limit means in fixed relation to the fourth valve element.

10. In a valve construction, a housing having an inlet, an outlet, and two working ports, all of said ports being for the passage of fluid into and out of the housing, an inlet chamber having coaxial oppositely spaced apertures, the inlet being connected to the chamber between the apertures, one aperture leading to each working port, an outlet chamber having coaxial oppositely spaced apertures, the outlet being connected to the outlet chamber between the apertures therein, one outlet aperture leading to each working port, a valve seat for each aperture, a valve assembly comprising four valve elements guidable by valve rod means for cooperation with said apertures, a first and second of said valve elements being wholly confined within said inlet chamber and having biasing means urging said valve elements away from one another, stop means on the valve rod means urging the first of said movable valve elements toward the second valve element by the action of said biasing means to close the second valve element against one of the apertures in the inlet chamber, said stop means further including means for urging the second of said movable valve elements toward the first valve element by the action of said biasing means to close the first valve element against a second one of the apertures in the inlet chamber when the movement of the valve rod means is reversed, the third and fourth of said valve elements being adapted to be attached to said valve rod means exteriorly of said outlet valve chamber, limit means on said valve rod means for limiting movement of the third valve element in one direction, and spacing means cooperating with said valve rod means for holding said third valve element against the limit means in fixed relation to the fourth valve element.

References Cited in the file of this patent

UNITED STATES PATENTS

| | | |
|---|---|---|
| 117,094 | Mead | July 18, 1871 |
| 132,497 | Spooner | Oct. 22, 1872 |
| 287,587 | Spooner | Oct. 30, 1883 |
| 344,080 | Cooper | June 22, 1886 |
| 447,883 | Knickerbocker | Mar. 10, 1891 |
| 468,008 | Knickerbocker | Feb. 2, 1892 |
| 504,283 | Sheppard | Aug. 29, 1893 |
| 517,368 | Sprague | Mar. 27, 1894 |
| 1,767,038 | Anderson | June 24, 1930 |
| 2,010,129 | Baker | Aug. 6, 1935 |
| 2,166,866 | Hansen | July 18, 1939 |
| 2,218,861 | Stumpf | Oct. 22, 1940 |
| 2,241,070 | McLenegan | May 6, 1941 |
| 2,276,814 | Zwickl | Mar. 17, 1942 |
| 2,372,311 | Brown | Mar. 27, 1945 |
| 2,379,109 | Shaw | June 26, 1945 |
| 2,401,144 | Dube | May 28, 1946 |
| 2,441,885 | Kembler | May 18, 1948 |
| 2,451,385 | Groat | Oct. 12, 1948 |
| 2,503,901 | Chace | Apr. 11, 1950 |
| 2,525,560 | Pabst | Oct. 10, 1950 |
| 2,534,031 | Kollsman | Dec. 12, 1950 |
| 2,555,483 | Grant | June 5, 1951 |
| 2,566,173 | Dillman | Aug. 28, 1951 |
| 2,608,990 | Crockett | Sept. 2, 1952 |
| 2,619,119 | Warcup | Nov. 25, 1952 |
| 2,638,123 | Vargo | May 12, 1953 |